US009203914B1

(12) United States Patent
Farago

(10) Patent No.: US 9,203,914 B1
(45) Date of Patent: Dec. 1, 2015

(54) ACTIVITY NOTIFICATION AND RECOMMENDATION

(71) Applicant: Google Inc., Mountain View, CA (US)

(72) Inventor: Julie Farago, Somerville, MA (US)

(73) Assignee: Google Inc., Mountain View, CA (US)

( * ) Notice: Subject to any disclaimer, the term of this patent is extended or adjusted under 35 U.S.C. 154(b) by 348 days.

(21) Appl. No.: 13/690,156

(22) Filed: Nov. 30, 2012

Related U.S. Application Data

(60) Provisional application No. 61/566,388, filed on Dec. 2, 2011.

(51) Int. Cl.
*G06F 15/16* (2006.01)
*H04L 29/08* (2006.01)

(52) U.S. Cl.
CPC ...................... *H04L 67/22* (2013.01)

(58) Field of Classification Search
USPC ......................................................... 709/204
See application file for complete search history.

(56) References Cited

U.S. PATENT DOCUMENTS

| 2007/0004385 | A1* | 1/2007 | Horvitz et al. ............. 455/414.1 |
| 2010/0024042 | A1* | 1/2010 | Motahari et al. ................. 726/26 |
| 2011/0223571 | A1* | 9/2011 | Farahat et al. ................. 434/236 |
| 2012/0122574 | A1* | 5/2012 | Fitzpatrick et al. ............. 463/31 |

* cited by examiner

*Primary Examiner* — Tu Nguyen
(74) *Attorney, Agent, or Firm* — Patent Law Works LLP

(57) ABSTRACT

A system and method for notifying people related to a user of an activity is disclosed. A processing module receives and processes the activity for the user. A notification module is communicatively coupled to the processing module. The notification module is configured to receive the activity from the processing module. The notification module is also configured to notify a social network of a start of the activity. The notification module is further configured to notify people related to the user of the activity.

20 Claims, 5 Drawing Sheets

ACTIVITY NOTIFICATION AND RECOMMENDATION

CROSS REFERENCE TO RELATED APPLICATIONS

This application claims priority under 35 USC §119(e) to U.S. Application No. 61/566,388, entitled "Activity Notification and Recommendation" filed Dec. 2, 2011, the entirety of which is herein incorporated by reference.

BACKGROUND

The specification relates to notifying people related to a user of an activity.

Social network applications are growing in popularity. Millions of people all over the world share information with friends, coworkers and other members using a social network. However, existing solutions for notifying people of activities in social networks have numerous problems.

First, existing solutions tie an activity to a physical location, for example, a hotel, a restaurant, etc., and only notify people of activities related to physical locations. Second, existing solutions merely notify other users of a completion of an activity. For example, existing solutions notify a user's friends that the user has run two miles in a park. However, at the point where the user has completed the activity, it is too late for the user's friends to join.

SUMMARY

According to one innovative aspect of the subject matter described in this disclosure, a processing module receives activity data relating to an activity being performed by a first user, the first user being associated with a social network, a determining engine extracts a feature from the activity data to identify the activity as the first user starting to purchase a product and a notification module notifies other users associated with the social network that the first user is starting to purchase the product.

In general, another innovative aspect of the subject matter described in this disclosure may be embodied in methods that include receiving, with one or more computing devices, activity data relating to an activity being performed by a first user, the first user being associated with a social network, extracting, with the one or more computing devices, a feature from the activity data to identify the activity as the first user starting to purchase a product and notifying, with the one or more computing devices, other users associated with the social network that the first user is starting to purchase the product. Other aspects include corresponding methods, systems, apparatus and computer program products.

These and other implementations may each optionally include one or more of the following features. For instance, operations further include processing activity data describing the activity to determine a location, wherein the location includes one of a physical location, a location specified by the first user, a location specified by an internet protocol address and a location specified by a uniform resource locator, and notifying the other users associated with the social network of the location. Operations further include generating a recommendation for the first user based on the activity data and wherein the recommendation includes one of a recommendation for an activity, a recommendation for forming an association with a new user of the social network and a recommendation for a product. Operations further include processing the activity data to determine a location and generating a recommendation for the first user based on the location and the feature. Operations further include applying a point to the first user as a reward for purchasing the product.

For instance, the features include the activity being an offline activity or an online activity. The features include the activity being an online activity that is received in response to the first user reaching a location.

The specification advantageously describes a system and method for notifying people related to a user that the user is starting to perform an activity in a location and generating a recommendation based on the activity. This helps users participate in more activities because they know what their connections are doing. In addition, the recommendations help users make new discoveries.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
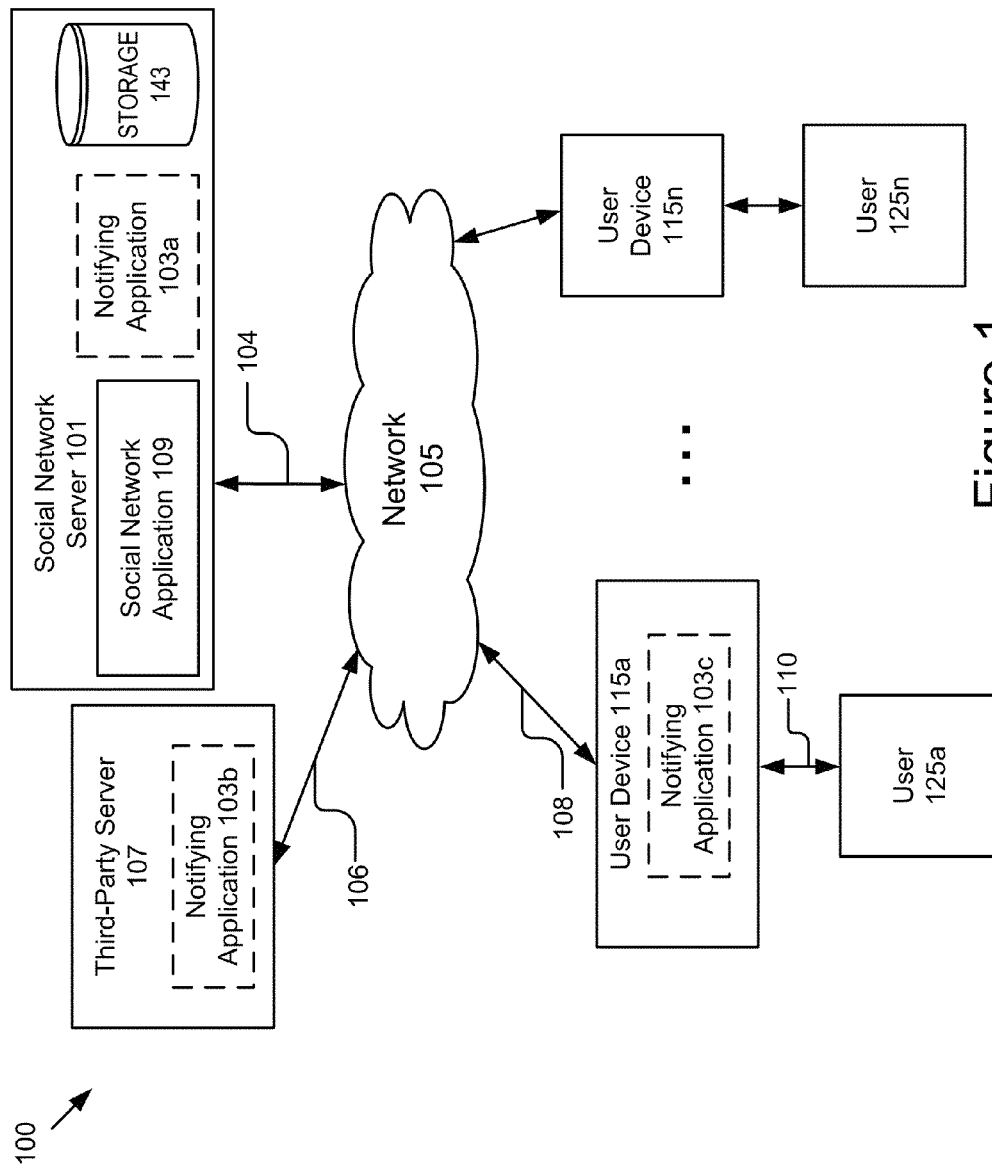
FIG. 1 is a block diagram illustrating an example system for notifying people that are related to a user of an activity.

FIG. 1 illustrates a block diagram of a system 100 for notifying people related to a user of an activity. The illustrated system 100 includes user devices 115a . . . 115n that are accessed by users 125a . . . 125n, a social network server 101 and a third-party server 107. In FIG. 1 and the remaining figures, a letter after a reference number, for example, "115a" is a reference to the element having that particular reference number. A reference number in the text without a following letter, for example, "115," is a general reference to different instances of the element bearing that reference number. Although only two devices are illustrated, an arbitrary number of user devices 115n is available to an arbitrary number of users 125n. In the illustrated instances, these entities are communicatively coupled via a network 105. While only one network 105 is present, in practice an arbitrary number of networks 105 can be connected to the user devices 115a . . . 115n, the social network server 101 and the third-party server 107.

The user devices 115a . . . 115n in FIG. 1 are used by way of example. While FIG. 1 illustrates three user devices, the description applies to any system architecture having one or more user devices. Furthermore, while only one network 105 is coupled to the user devices 115a . . . 115n, the social network server 101 and the third-party server 107, in practice any number of networks 105 can be connected to the entities.

In some instances, the notifying application 103a is operable on the social network server 101, which is coupled to the network 105 via signal line 104. The social network server 101 also contains a social network application 109 and a storage device 143. Although only one social network server 101 is shown, multiple servers may be present. The social network server 101 can include software for generating and managing a social network. The social network includes the relationships that are defined in a social graph. The social graph is a mapping of users in a social network and how they are related to each other.

The social network application 109 is code and routines stored on a memory (not pictured) of the social network server 101 that, when executed by a processor (not pictured) of the social network server 101, causes the social network server 101 to provide a social network accessible by a user device 115*a* . . . 115*n* via the network 105. The social network application 109 registers users for the social network. For example, the user specifies a username and password. In some instances, the user provides more detailed information that the social network application 109 uses to create a user profile. For example, the user specifies a list of interests (e.g. hobbies, favorite television shows, admired people, companies that the user approves of, etc.).

The social network application 109 manages the social network. For example, the social network application 109 manages the posting of content, e.g. text, images, video, comments, check-ins, creation of groups, etc. The social network application 109 is communicatively coupled to the user devices 115*a* . . . 115*n*, the storage device 143 and the notifying application 103. In some instances, the notifying application 103*a* is part of the social network application 109.

The social network application 109 maintains relationships between users in a social graph. For example, a first user can create a group and add the second user to the group. The first user has a first-degree relationship with the second user. If the second user has a relationship with a third user that is unrelated to the first user, the first user has a second-degree relationship with the third user. In some instances, the social network application 109 maintains a relationship type and level for the connections between users. Relationship type includes, for example, friendship, family, business association, etc. Level includes, for example, acquaintance, close friendship, close family, etc. In some instances, the social network application 109 generates an affinity score between users that takes into account the type of relationship, the number of indications of acknowledgement or comments that the users provided to the other user's content, a number of messages between the users, etc.

In other instances, the notifying application 103*b* is stored on the third-party server 107, which is connected to the network 105 via signal line 106. The third-party server 107 includes software for generating a website (not shown). In some instances, the notifying application 103 generates a user interface that is incorporated into the website. While only one third-party server 107 is shown, the system 100 could include multiple third-party servers 107.

In other instances, the notifying application 103*c* is stored on the user device 115*a*, which is connected to the network 105 via signal line 108. The user 125*a* interacts with the user device 115*a* via signal line 110. For example, the user device 115*a* . . . 115*n* is a personal computer ("PC"), a cell phone (e.g., a smart phone, a feature phone, a dumb phone, etc.), a tablet computer (or tablet PC), a laptop, etc. One having ordinary skill in the art will recognize that other types of user devices 115*a* . . . 115*n* are possible. In some instances, the system 100 comprises a combination of different types of user devices 115*a* . . . 115*n*. In some instances, the user device 115 is a cell phone and the notifying application 103*c* is a thin client, for example, a mobile application that accesses remotely stored information via the network 105. In other instances, the notifying application 103*c* is a desktop application. The notifying application 103 can be stored in any combination on the devices and servers.

The network 105 is a conventional type, wired or wireless, and may have arbitrary number of configurations, for example, a star configuration, token ring configuration or other configurations known to those skilled in the art. Furthermore, the network 105 may include a local area network (LAN), a wide area network (WAN) (e.g., the Internet), and/or other interconnected data path across which multiple devices may communicate. In yet other instances, the network 105 may be a peer-to-peer network. The network 105 may also be coupled to or includes portions of a telecommunications network for sending data in a variety of different communication protocols. In some instances, the network 105 includes Bluetooth communication networks or a cellular communications network for sending and receiving data, for example, via short messaging service (SMS), multimedia messaging service (MMS), hypertext transfer protocol (HTTP), direct data connection, WAP, email, etc.

The notifying application 103 is code and routines for providing a notification service. A notification service is a service that notifies people related to a user of an activity performed by the user. The notifying application 103 is communicatively coupled to the social network application 109 and the user devices 115*a* . . . 115*n*. In some instances, the notifying application 103 receives and processes an activity for the user and notifies a social network that the user is starting to perform the activity. In other instances, the notifying application 103 receives and processes an activity for a user and notifies people related to the user of the activity. In some other instances, the notifying application 103 processes one or more activities performed by the user and/or people related to the user and generates a recommendation for the user based at least in part on the one or more activities. The notifying application 103 is described in further detail below with reference to FIGS. 2-5.

An activity is an action taken by a user. For example, an activity is one of browsing a website, viewing a video on a video hosting site, reading an article in a website, listening to a piece of music in a website, uploading a photo to a server, checking emails, drafting an email, playing games online, etc. In another example, an activity is one of purchasing a product using a credit card in a mall, shopping in a store, dining in a restaurant, arriving in a place, etc. Other examples of activities are possible.

In some instances, the activity is related to one of a location specified by a uniform resource locator (URL), an internet protocol (IP) address, a tag, a check-in and the like. In other instances, an activity is related to a physical location, for example, a theater, a hotel, work, my house, etc.

The storage device 143 is a non-transitory memory that stores data, for example, activity data, location data and data for a social graph. The activity data is data describing one or more activities. For example, the activity data describes that a user is browsing a website. The location data is data describing a location. The location data is described in further detail with reference to FIG. 2. The storage device 143 may store other information for providing the notification service.

Figure 2:
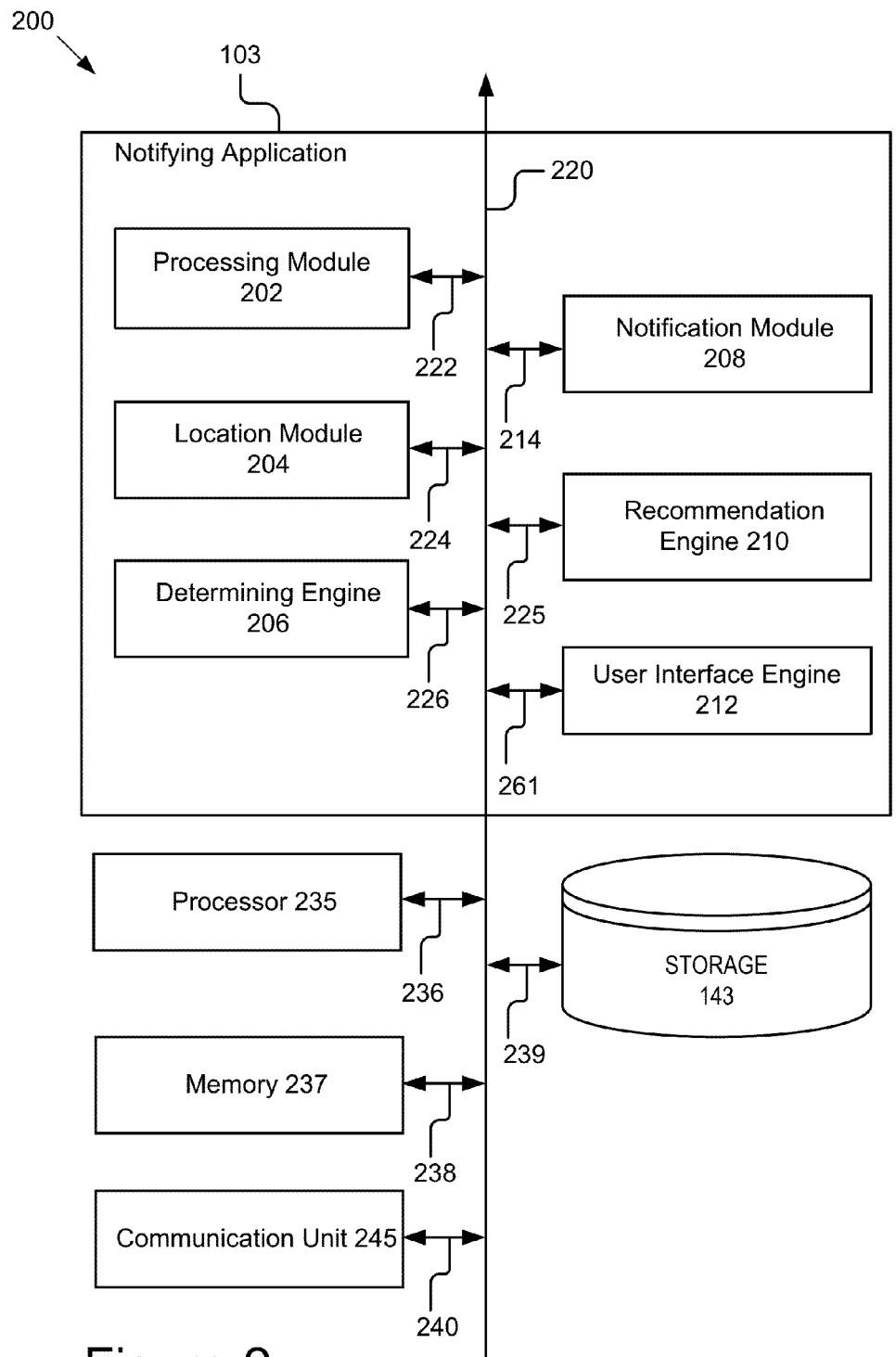
FIG. 2 is a block diagram illustrating an example notifying application.

Referring now to FIG. 2, the notifying application 103 is shown in more detail. FIG. 2 is a block diagram of a computing device 200 that includes the notifying application 103, a memory 237, a processor 235 and a communication unit 245 that are each coupled to a bus 220. Optionally, the computing device 200 also includes a storage device 143. In some instances, the computing device 200 is the social network server 101. In other instances, the computing device 200 is the third-party server 107. In yet another instance, the computing device 200 is the user device 115*a*. For simplicity, the computing device 200 is described as being the social network server 101, however, the description can be modified to apply to the computing device 200 being the third-party server 107 or the user device 115*a*.

The processor 235 includes an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may include various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. Other processors, operating systems, sensors, displays and physical configurations are possible.

The memory 237 stores instructions and/or data that may be executed by processor 235. The memory 237 is coupled to the bus 220 for communication with the other components via signal line 238. The instructions and/or data may comprise code for performing the techniques described herein. The memory 237 may be a dynamic random access memory (DRAM) device, a static random access memory (SRAM) device, flash memory or some other memory device known in the art. In some instances, the memory 237 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known in the art for storing information on a more permanent basis.

The storage device 143 stores instructions and/or data that may be executed by the processor 235. For example, the storage device 143 stores activity data 241, social data 243 and location data 245. The storage device 143 is communicatively coupled by the bus 220 for communication with the other components of the computing device 200 via signal line 239.

In the example where the computing device 200 is a social network server 101, the communication unit 245 transmits and receives data to and from the user device 115 and the third-party server 107. If the computing device 200 is a third-party server 107, the communication unit 245 transmits data to and from the social network server 101 and the user device 115. And if the computing device 200 is a user device 115, the communication unit 245 transmits data to and from the third-party server 107 and the social network server 101.

The communication unit 245 is coupled to the bus 220 via signal line 240. In some instances, the communication unit 245 includes a port for direct physical connection to the user device 115, the third-party server 107 or to another communication channel. For example, the communication unit 245 includes a USB, SD, CAT-5 or similar port for wired communication with the user device 115. In other instances, the communication unit 245 includes a wireless transceiver for exchanging data with the user device 115, the third-party server 107 or other communication channel using one or more wireless communication methods, for example, IEEE 802.11, IEEE 802.16, BLUETOOTH® or another suitable wireless communication method.

In other instances, the communication unit 245 includes a cellular communications transceiver for sending and receiving data over a cellular communications network, for example, via short messaging service (SMS), multimedia messaging service (MMS), hypertext transfer protocol (HTTP), direct data connection, WAP, e-mail or another suitable type of electronic communication. In some other instances, the communication unit 245 includes a wired port and a wireless transceiver. The communication unit 245 also provides other conventional connections to the network for distribution of files and/or media objects using standard network protocols, for example, TCP/IP, HTTP, HTTPS and SMTP as will be understood to those skilled in the art.

In the illustrated instance, the notifying application 103 includes a processing module 202, a location module 204, a determining engine 206, a notification module 208, a recommendation engine 210 and a user interface engine 212.

The processing module 202 can be software including routines for receiving and processing an activity performed by a user via the communication unit 245. In some instances, the processing module 202 can be a set of instructions executable by the processor 235 to provide the functionality described below for receiving and processing an activity. In other instances, the processing module 202 can be stored in the memory 237 of the computing device 200 and can be accessible and executable by the processor 235. The processing module 202 may be adapted for cooperation and communication with the processor 235 and other components of the computing device 200 via signal line 222.

The processing module 202 receives an input for an activity performed by a user from a user device 115*a* ... 115*n*. In some instances, the input for the activity is manually provided by a user. For example, the user inputs a description for an activity or presses an activity processing button in a user interface displayed on a user device 115*a* and sends the input to the processing module 202. This is referred to as an offline activity.

In the instance where the user consents to the use of such data, the input for the activity is automatically received from a user device 115*a*. This is referred to as an online activity. For example, the user registers with an application installed on the user device 115*a* to determine and send an activity to the processing module 202 that the user performs using the application, such as purchasing a product. In some other instances, a user registers with a third-party service, such as a credit card service that the user authorizes to allow a credit card processor to send an activity related to using the credit card to the processing module 202. In some instances, the notifying application 103 or the credit card service also includes a points system to reward the user for purchasing products or incorporating the credit card usage into the notifications. This benefits both the credit card company and the user because the credit card company learns about the user's activities and obtains greater visibility with the user's connections and the user obtains points. In the instance where the user consents to collection of certain information from the third-party service or the processing module 202, the information may be used for notifying people related to the user of an activity.

The processing module 202 identifies an activity as being an online activity when the processing module 202 receives input about a location and the location module 204 identifies the location as one where certain activities occur, for example, the processing module 202 receives a location at the gym and therefore identifies the activity as exercising. In another example, the processing module 202 receives an input and the determining engine 206 identifies the activity based on the input. The processing module 202 identifies an activity as being an offline activity when the processing module 202 receives an input from the user that specifies the activity, for example, the user specifies that he is starting to read a book at home.

The processing module 202 receives the activity from the input and stores the activity data 241 in the storage device 143. The processing module 202 sends the activity data 241 to one or more of the location module 204, the determining engine 206, the notification module 208 and the recommendation engine 210. In some instances, the processing module 202 organizes the activity data 241 in a feed so that the feed includes the activities performed by the user.

The location module 204 can be software including routines for determining a location for an activity. In some instances, the location module 204 can be a set of instructions executable by the processor 235 to provide the functionality described below for determining a location for an activity. In other instances, the location module 204 can be stored in the memory 237 of the computing device 200 and can be accessible and executable by the processor 235. The location module 204 may be adapted for cooperation and communication with the processor 235 and other components of the computing device 200 via signal line 224.

In the instance where the user consents to the use of such data, the location module 204 receives activity data for an activity from the processing module 202. In some instances, the location module 204 retrieves the activity data from the storage device 143. The location module 204 processes the activity data and determines a location for the activity. In some instances, the location is one of a physical location, a location specified by a user, a location specified by an IP address or a location specified by a URL. For example, the location module 204 identifies activity data describing a user reading an article on a website and determines an address for the article specified by a URL. In some instances, the location module 204 retrieves other information related to the location from the location data 245 in the storage device 143. For example, the location module 204 determines a map and directions for the location from the location data 245.

The location module 204 sends the location for the activity to one or more of the notification module 208 and the recommendation engine 210. In some instances, the location module 204 stores the location in the location data. Optionally, the location module 204 sends other information related to the location (e.g., a map) to the notification module 208.

The determining engine 206 can be software including routines for identifying activity data and extracting one or more features for an activity to identify a type of activity that the user is starting to perform. In some instances, the determining engine 206 can be a set of instructions executable by the processor 235 to provide the functionality described below for parsing activity data 241 and extracting one or more features for an activity. In other instances, the determining engine 206 can be stored in the memory 237 of the computing device 200 and can be accessible and executable by the processor 235. The determining engine 206 may be adapted for cooperation and communication with the processor 235 and other components of the computing device 200 via signal line 226.

The determining engine 206 receives activity data for an activity from the processing module 202. In some instances, the determining engine 206 retrieves the activity data 241 from the storage device 143. The determining engine 206 identifies the activity data 241 and extracts one or more features from the activity data. For example, the determining engine 206 extracts features from activity data to identify a type of activity as the user starts to perform the activity. In another example, the determining engine 206 identifies the activity data to extract one or more features for a video, for example, a title, a brief description, ratings, one or more keywords, metadata for the video, etc. Further examples of features extracted by the determining engine 206 include, but are not limited to, one or more features for a piece of music (e.g., a title, an artist, an album, etc.), one or more features for an article published on a website (e.g., a title, an author, an abstract, section titles, photos/audio/video embedded in the article, etc.), one or more features for a photo (e.g., a photographer, a subject for the photo, a title and other metadata for the photo) and/or one or more features for a credit card transaction (e.g., a product name, the time of the transaction, etc.). The determining engine 206 sends the extracted features to one or more of the notification module 208 and the recommendation engine 210. In some instances, the determining engine 206 stores the extracted features in the storage device 143.

The notification module 208 can be software including routines for notifying the social network of user activity via the communication unit 245. In some instances, the notification module 208 can be a set of instructions executable by the processor 235 to provide the functionality described below for notifying people related to a user of an activity. In other instances, the notification module 208 can be stored in the memory 237 of the computing device 200 and can be accessible and executable by the processor 235. The notification module 208 may be adapted for cooperation and communication with the processor 235 and other components of the computing device 200 via signal line 214.

In the instance where the user consents to the use of such data, the notification module 208 receives activity data describing an activity from the processing module 202. In some instances, the notification module 208 receives a location and other information related to the location from the location module 204. In other instances, the notification module 208 receives one or more features for the activity from the determining engine 206. In some other instances, the notification module 208 retrieves one or more of the activity data, the location data, other information related to the location and the one or more features from the storage device 143.

In some instances, the notification module 208 notifies the social network. A notification is a message that notifies other users of a social network that the user is performing an activity. For example, the notification module 208 notifies a user's connections that the user is viewing a video on a video hosting site. In the instance where the user consents to the use of such data, the notification module 208 retrieves relationships (e.g., friendship, family, etc.) from a social graph stored in the social data, determines people related to the user based on the relationships and notifies people related to the user of the activity. In other instances, the notification module 208 receives activity data describing a start of an activity, determines people related to the user and notifies people related to the user of the start of the activity. The feature for notifying people related to the user of a start of an activity is advantageous since, for example, it allows people related to the user to participate in the activity together with the user.

In some instances, the notification module 208 determines a predicted length of an activity. In the instance where the user consents to the use of such data, the notification module 208 receives location information associated with the user from the location module 204 related to past activities and predicts that the current activity will take the same amount of time. For example, based on GPS data the user goes running for an hour at 9:00 am every Monday. As a result, when the activity is running and it starts at 9:00 am on a Monday, the notification module 208 predicts that the running will take an hour and transmits a notification to the social network indicating that the predicted time for the activity will be from 9:00 am to 10:00 am. In another instance, the user manually enters an expected duration of the activity. In yet another instance, the notification module 208 is connected to the user's calendar (or the notifying application 103 includes a calendar module for managing events), where the user enters a duration for events. For example, the user creates a meeting in the calendar and the notification module 208 transmits a notification about the meeting with a duration based on the meeting from the calendar. In some instances, the notification module 208 predicts the length of the activity based on an average time that other users performed a similar activity. For example, where the activity is eating dinner, the notification module 208 determines that other users that ate dinner took 1.5 hours to eat and predicts that the user will also take 1.5 hours to eat.

In other instances, the notification module 208 notifies people related to the user of the activity and sends one or more of a location, information related to the location and one or more features for the activity to people related to the user. For example, the notification module 208 sends one or more of the activity data, the location and the one or more features to the user interface engine 212 and instructs the user interface engine 212 to generate a user interface for presenting the one or more of the activity data, the location and the one or more features to the people related to the user. Often the user location is not a physical location that the user's friends would visit but more of a helpful indication of context. For example, when a user is beginning to edit a document, it does not matter whether the user is at work or at home because the other users can collaborate in editing the document from different locations. Alternately, the user checks-in to a photograph. In other instances, however, the physical location is helpful for the user's friends to join the user, for example, when the activity is Artist X's concert and the location is the Famous Brand Arena.

In other instances, the notification module 208 notifies a social network of an activity performed by a user. For example, the notification module 208 sends the activity data to a social network provided by the social network application 109. In some instances, the notification module 208 notifies the social network of a start of the activity. For example, the notification module 208 receives activity data describing a start of an activity from the processing module 202 and notifies the social network provided by the social network application 109 that the user is starting to perform the activity. The social network application 109 then retrieves relationships for the user from a social graph stored in the social data 243, determines people related to the user and notifies the people that the user is starting to perform the activity.

In other instances, the notification module 208 notifies a group of people as specified by the user of the activity. For example, the user generates a group of friends that excludes work colleagues so that the work colleagues do not know how often the user is shopping. Alternatively, the notification module 208 notifies a work group of work-related activities to avoid boring the user's friends. For example, the notification module 208 notifies a workflow group that the user is beginning to start a Question & Answer document for the group. In some instances, the notification module 208 by default notifies a subset of groups, for example, close friend of the user on the social network. In some instances, the user specifies the audience for the notification of activities. For example, the user specifies that all activities involving concerts should be posted to a music group and not a business group.

The recommendation engine 210 can be software including routines for generating a recommendation for a user. In some instances, the recommendation engine 210 can be a set of instructions executable by the processor 235 to provide the functionality described below for generating a recommendation for a user. In other instances, the recommendation engine 210 can be stored in the memory 237 of the computing device 200 and can be accessible and executable by the processor 235. The recommendation engine 210 may be adapted for cooperation and communication with the processor 235 and other components of the computing device 200 via signal line 225.

The recommendation engine 210 receives activity data from the processing module 202. In some instances, the activity data describes one or more activities performed by a user and/or one or more activities performed by people related to the user. The recommendation engine 210 generates a recommendation for the user based on the activity data. For example, the recommendation engine 210 processes a set of activity data describing three friends that viewed a movie and recommends the user to view the same movie based on the friends' activities. In the instance where the user consents to the use of such data, the recommendation engine 210 recommends friends that are located within the user's proximity who are performing a similar activity, e.g., another user that is attending the same concert. In the instance where the users consent to the use of such data, the recommendation engine 210 also makes the recommendation based on similarities in user profiles. For example, the recommendation engine 210 identifies a group of people that consistently have "reading books" as an activity in Cambridge, Mass. The recommendation engine 210 identifies a subset of people from the group based on user profiles that list autobiographies as an interest and suggests connections to the users because they could form a book club to talk about autobiographies. In some instances, the recommendation is one of a recommendation for activities, a recommendation for new connections in the social network and a recommendation for products. In other instances, the recommendation engine 210 provides the user with advertisements that are associated with the recommendations. For the above example, the recommendation engine 210 recommends that the user purchase an autobiography from an online retailer.

In some instances, the recommendation engine 210 receives one or more locations from the location module 204 and one or more features from the determining engine 206. The recommendation engine 210 generates a recommendation for the user based on the activity data, the one or more locations and the one or more features. For example, the recommendation engine 210 creates a model that takes one or more of the activity data, the locations and the one or more features as inputs and generates a recommendation as an output.

The recommendation engine 210 sends the recommendation to the user. In some instances, the recommendation engine 210 sends the recommendation to the user interface engine 212 and instructs the user interface engine 212 to generate graphical data for presenting the recommendation to the user via a user interface. The user interface engine 212 sends the graphical data to a user device 115a ... 115n for depicting the recommendation to the user.

The user interface engine 212 can be software including routines for generating a user interface that displays activities and recommendations to a user via the communication unit 245. In some instances, the user interface engine 212 can be a set of instructions executable by the processor 235 to provide the functionality described below for presenting activities and recommendations to a user. In other instances, the user interface engine 212 can be stored in the memory 237 of the computing device 200 and can be accessible and executable by the processor 235. The user interface engine 212 may be adapted for cooperation and communication with the processor 235 and other components of the computing device 200 via signal line 261.

The user interface engine 212 receives one or more of the activity data 241, the location data 245, other information related to the location and one or more features from the notification module 208 and generates graphical data for providing a user interface to present a notification to people related to a user. In some instances, the notification includes one or more of a description for the activity, the location, other information related to the location and the one or more features. In some instances, the user interface engine 212 sends the graphical data to an application (e.g., a browser) in the user device 115a . . . 115n causing the application to present the notification to people related to the user. In other instances, the notifying application 103c is stored on the user device and the user interface engine 212 sends the graphical data to the display device for display.

In some instances, the user interface engine 212 receives a recommendation for the user from the recommendation engine 210 and generates graphical data to present the recommendation to the user via a user interface. The user interface engine 212 sends the graphical data to an application in a user device 115a . . . 115n causing the application to present the recommendation to the user.

In other instances, the user interface engine 212 provides a user interface including one or more fields, drop down boxes or other conventional graphics used by a user to input an activity and send the activity to the processing module 202. For example, the user reports an activity to the processing module 202 by clicking a button in a user interface displayed on a smart phone. In some instances, the user interface engine 212 provides a user interface for specifying who should receive notifications. For example, the user interface engine 212 creates groups of people to receive the notification, for example, a group of friends, family or coworkers.

Figure 3:
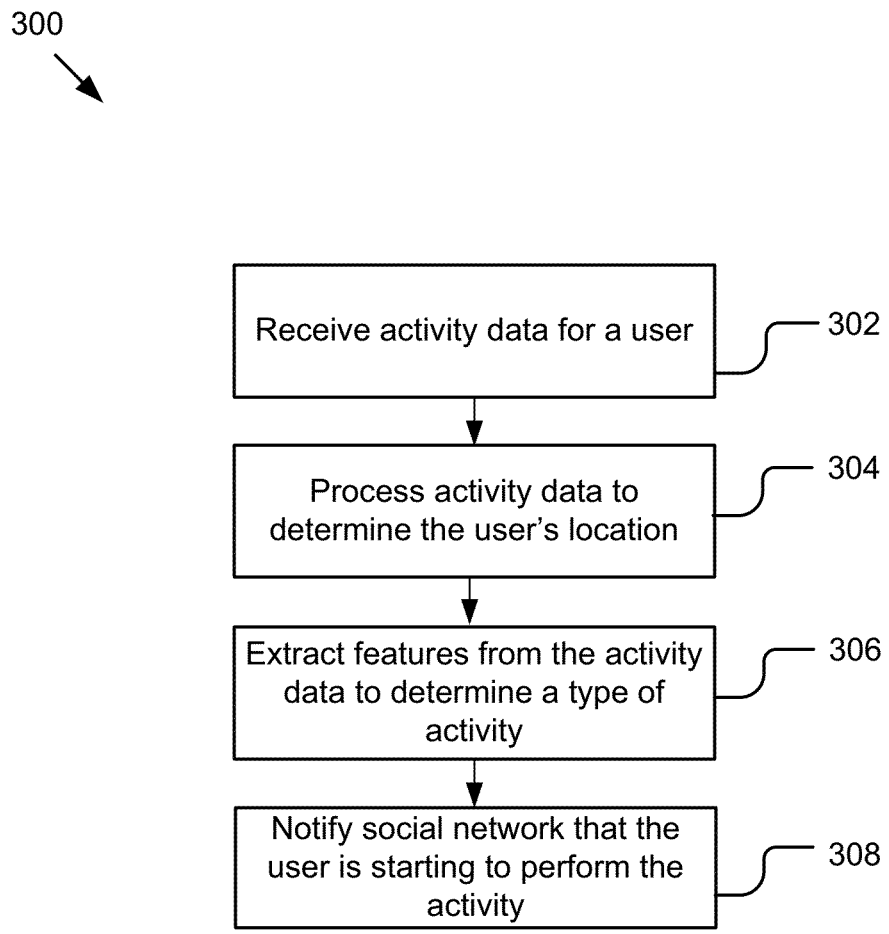
FIG. 3 is a flowchart of an example method for notifying people related to a user of an activity.
Figure 4:
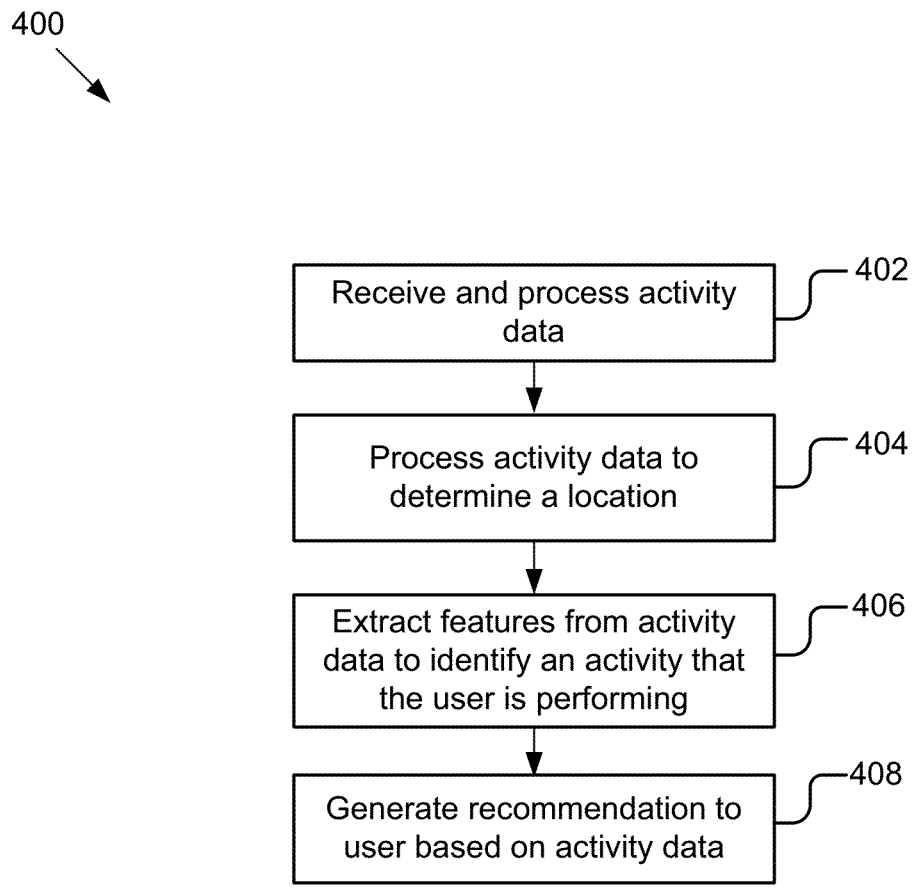
FIG. 4 is a flowchart of an example method for generating a recommendation for a user.

Referring now to FIGS. 3 and 4, various example methods of the specification will be described. FIG. 3 includes a flow diagram 300 of an example method for notifying other users of a social network of a first user's activity. The processing module 202 receives 302 activity data for a user. For example, the processing module 202 receives a location for the user and transmits the location to the location module 204. In one example, the processing module 202 stores activity data describing the activity in storage 243. The processing module 202 sends the activity data to the notification module 208. In some instances, the processing module 202 additionally sends the activity data to one or more of the location module 204 and the determining engine 206.

The location module 204 processes 304 the activity data to determine the user's location. The location module 204 determines one of a location input by a user, a physical location, a location specified by an IP address and a location specified by a URL for the activity. For example, the location module 204 identifies the name of the craft store based on GPS information. In some instances, the location module 204 determines other information related to the location (e.g., a map, directions, etc.) for the activity. The location module 204 sends the location and the other information related to the location to the notification module 208. For example, the location module 204 determines that the user is at a shopping mall based on the user's location.

The determining engine 206 receives the activity data from the processing module 202 and extracts 306 features from the activity data to determine a type of activity. For example, if the activity data includes a location of the user at a paintbrush store, the determining engine 206 determines that the user is shopping. If the activity data describes a user purchasing a paintbrush using a credit card online, in the instance where the user consents to the use of such data, the determining engine 206 identifies the activity data and extracts the name for the product and the time for the transaction. In some instances, the user receives points from the credit card company each time a notification about the credit card is published to the social network. For example, the user receives points when the notification module 208 transmits a notification that "Sara B. made a purchase using her Company B Platinum Card." The determining engine 206 sends one or more features to the notification module 208. In some instances, the notification module 208 asks the user for permission to publish information about the transaction each time to ensure that certain information is not published. In some instances, the determining engine 206 receives the user's location from the location module 204. For example, based on the user's location, the determining engine 206 determines that the activity is shopping. In instances, the user manually inputs via a user interface that the user is shopping and the processing module 202 processes the information.

The notification module 208 receives the activity data from the processing module 202. In some instances, the notification module 208 receives the activity from the determining engine 206. The notification module 208 notifies 308 a social network that the user is starting to perform the activity. For example, the notification module 208 notifies the social network that the user began shopping at a craft store. In some instances, the social network is provided by the social network application 109. In some instances, the notification module 208 notifies people related to the user on the social network or selected groups about the activity.

FIG. 4 includes a flow diagram 400 of an example method for generating a recommendation for a user. The processing module 202 receives activity data describing one or more activities performed by a user and/or people related to the user. The processing module 202 receives and processes 402 the activity data. For example, the processing module 202 stores the activity data and sends the activity data to the location module 204 and the determining engine 206.

In some instances, the location module 204 receives the activity data from the processing module 202 and processes 404 the activity data to determine a location for the one or more activities. The location module 204 sends the one or more locations to the recommendation engine 210. The determining engine 206 receives the activity data from the processing module 202 and extracts 406 features from the activity data to identify a type of activity that the user is performing. The determining engine 206 sends the one or more features to the recommendation engine 210.

The recommendation engine 210 receives the activity data from the processing module 202. In some instances, the recommendation engine 210 retrieves the activity data. The recommendation engine 210 generates 408 a recommendation for the user based on the activity data. In some instances, the recommendation engine 210 receives one or more locations from the location module 204 and one or more features from the determining engine 206. The recommendation engine 210 generates a recommendation based on one or more of the activity data, the one or more locations and the one or more features. The recommendation includes a recommendation for activities, a recommendation for new friends and a recommendation for products. For example, if a user is fishing, the recommendation engine 210 could suggest fishing equipment for the user to purchase. The recommendation engine 210 sends the recommendation to the user.

Figure 5:
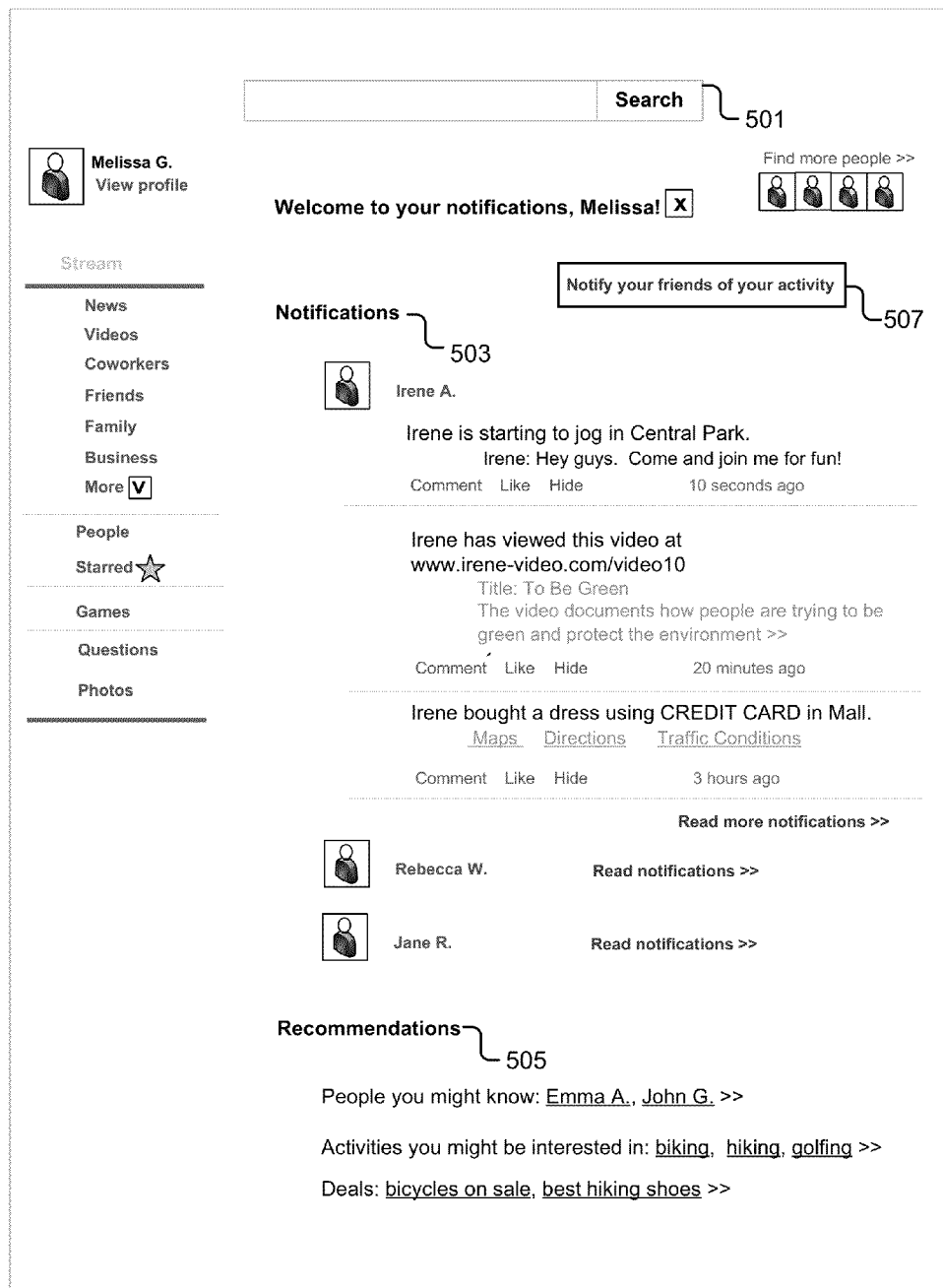
FIG. 5 is a graphic representation of an example user interface for presenting activities and recommendations to a user.

FIG. 5 includes an example graphical representation 500 of a user interface that is generated by the user interface engine 212 for presenting activities and recommendations to a user. The graphical representation 500 is displayed on a large screen, for example, a screen associated with a desktop computer or a laptop or a smaller screen, for example, a screen on a mobile device. In this example, the notifying application 103 is displayed as a product called "notifications." This interface contains a search bar 501 at the top. Other versions of the notifying application 103 are possible, which omit the search bar and are privately labeled.

The user is Melissa G. and the user interface allows Melissa to view notifications 503 from her friends. For example, if Melissa clicks on "Irene A.," recent activities performed by Irene are included in the user interface. In this example, Irene provided the offline activity of jogging and the processing module 202 received the online activity of purchasing the dress with the credit card. The graphic representation 500 also presents recommendations 505 (e.g., recommendations for friends, activities and deals, etc.) to Melissa. Additionally, the user interface provides Melissa with options to notify her friends of her activities. For example, a "Notify your friends of your activity" button 507 allows Melissa to send her activities to her friends. The recommendations 505 also include advertisements in the deal section that offer bicycles on sale and the best hiking shoes.

In the above description, for purposes of explanation, numerous specific details are set forth in order to provide a thorough understanding of the specification. It will be apparent, however, to one skilled in the art that the technology can be practiced without these specific details. In other instances, structures and devices are shown in block diagram form in order to avoid obscuring the description. For example, in some instances described primarily with reference to user interfaces and particular hardware. However, the description applies to any type of computing device that can receive data and commands, and any peripheral devices providing services.

Reference in the specification to "some instances" or "an instance" means that a particular feature, structure, or characteristic described in connection with the instance is included in at least one instance of the description. The appearances of the phrase "in one instance" in various places in the specification are not necessarily all referring to the same instance.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms, for example, "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware description, an entirely software description or some instances containing both hardware and software elements. In some instances, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving, with one or more computing devices, activity data relating to an activity being performed by a first user, the first user being associated with a social network;
determining a location from the activity data as the first user starts to perform the activity;
extracting, with the one or more computing devices, a feature from the activity data to identify a type of activity as the first user starts to perform the activity;
determining, with the one or more computing devices, a predicted time length of the activity based on the type of activity;
notifying, with the one or more computing devices, other users associated with the first user in the social network that the first user is starting to perform the activity and the predicted time length of the activity;
determining, from the other users, a second user that is performing a similar activity in proximity of the location; and
recommending the second user to the first user.

2. The method of claim 1, wherein the activity is an offline activity that is received from the first user.

3. The method of claim 1, wherein the activity is an online activity that is received in response to the first user reaching the location.

4. The method of claim 1 further comprising:
processing the activity data to determine the location, wherein the location includes one of a physical location, a location specified by the first user, a location specified by an internet protocol address and a location specified by a uniform resource locator; and
notifying the other users associated with the first user in the social network of the location.

5. The method of claim 1, further comprising generating a recommendation for the first user based on the activity data and wherein the recommendation includes one of a recommendation for the activity, a recommendation for forming an association with a new user of the social network and a recommendation for a product.

6. The method of claim 1 further comprising:
determining a map and directions to the location; and
notifying the other users associated with the first user in the social network of the map and the directions to the location.

7. The method of claim 1, further comprising applying a point to the first user as a reward for purchasing a product.

8. A system comprising:
a processer; and
a memory storing instructions that, when executed, cause the system to:
receive activity data relating to an activity being performed by a first user, the first user being associated with a social network;
determine a location from the activity data as the first user starts to perform the activity;
extract a feature from the activity data to identify a type of activity as the first user starts to perform the activity;
determine a predicted time length of the activity based on the type of activity;
notify other users associated with the first user in the social network that the first user is starting to perform the activity and the predicted time length of the activity;
determine, from the other users, a second user that is performing a similar activity in proximity of the location; and
recommend the second user to the first user.

9. The system of claim 8, wherein the activity is an offline activity that is received from the first user.

10. The system of claim 8, wherein the activity is an online activity that is received in response to the first user reaching the location.

11. The system of claim 8, wherein the memory storing instructions that, when executed, cause the process to:
process the activity data to determine the location, wherein the location includes one of a physical location, a location specified by the first user, a location specified by an internet protocol address and a location specified by a uniform resource locator; and
notify the other users associated with the first user in the social network of the location.

12. The system of claim 8, wherein the memory storing instructions that, when executed, cause the process to:
generate a recommendation for the first user based on the activity data; and
wherein the recommendation includes one of a recommendation for an activity, a recommendation for forming an association with a new user of the social network and a recommendation for a product.

13. The system of claim 8, wherein the memory storing instructions that, when executed, cause the process to apply a point to the first user as a reward for purchasing a product.

14. A computer program product comprising a non-transitory computer usable medium including a computer readable program, wherein the computer readable program when executed on a computer causes the computer to:
- receive activity data relating to an activity being performed by a first user, the first user being associated with a social network;
- determine a location from the activity data as the first user starts to perform the activity;
- extract a feature from the activity data to identify a type of activity as the first user starts to perform the activity;
- determine a predicted time length of the activity based on the type of the activity;
- notify other users associated with the first user in the social network that the first user is starting to perform the activity and the predicted time length of the activity;
- determine, from the other users, a second user that is performing a similar activity in proximity of the location; and
- recommend the second user to the first user.

15. The computer program product of claim 14, wherein the activity is an offline activity that is received from the first user.

16. The computer program product of claim 14, wherein the activity is an online activity that is received in response to the first user reaching the location.

17. The computer program product of claim 14, wherein the computer readable program when executed causes the computer to:
- processing activity data describing the activity to determine the location, wherein the location includes one of a physical location, a location specified by the first user, a location specified by an internet protocol address and a location specified by a uniform resource locator; and
- notifying the other users associated with the first user in the social network of the location.

18. The computer program product of claim 14, wherein the computer readable program when executed causes the computer to:
- generate a recommendation for the first user based on the activity data; and
- wherein the recommendation includes one of a recommendation for an activity, a recommendation for forming an association with a new user of the social network and a recommendation for a product.

19. The computer program product of claim 14, wherein the computer readable program when executed causes the computer to:
- determine a map and directions to the location; and
- notify the other users associated with the first user in the social network of the map and the directions to the location.

20. The computer program product of claim 14, wherein the computer readable program when executed causes the computer to apply a point to the first user as a reward for purchasing a product.

* * * * *